United States Patent
Nakamura et al.

(10) Patent No.: US 10,430,930 B2
(45) Date of Patent: Oct. 1, 2019

(54) IMAGE PROCESSING APPARATUS, IMAGE PROCESSING METHOD, AND IMAGE PROCESSING PROGRAM FOR PERFORMING DYNAMIC RANGE COMPRESSION PROCESS

(71) Applicant: FUJIFILM Corporation, Tokyo (JP)

(72) Inventors: Keigo Nakamura, Kanagawa (JP); Tomoyuki Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 15/638,380

(22) Filed: Jun. 30, 2017

(65) Prior Publication Data

US 2018/0061023 A1 Mar. 1, 2018

(30) Foreign Application Priority Data

Aug. 31, 2016 (JP) .................. 2016-170251

(51) Int. Cl.
| | |
|---|---|
| *G06K 9/00* | (2006.01) |
| *G06T 5/00* | (2006.01) |
| *G06T 7/136* | (2017.01) |
| *G06T 7/11* | (2017.01) |
| *G06T 5/40* | (2006.01) |

(52) U.S. Cl.
CPC ............. *G06T 5/007* (2013.01); *G06T 5/40* (2013.01); *G06T 7/11* (2017.01); *G06T 7/136* (2017.01); *G06T 2207/10116* (2013.01)

(58) Field of Classification Search
CPC . G06T 2207/10116; G06T 5/40; G06T 5/009; G06T 7/0012; G06T 5/007; G06K 9/4642
See application file for complete search history.

(56) References Cited

U.S. PATENT DOCUMENTS

| | | | | |
|---|---|---|---|---|
| 5,471,987 | A | * 12/1995 | Nakazawa | ............. G06T 5/004 128/925 |
| 8,411,994 | B2 | 4/2013 | Takahashi | |
| 2003/0210831 | A1 | * 11/2003 | Shinbata | ................. G06T 5/009 382/274 |

(Continued)

FOREIGN PATENT DOCUMENTS

| | | |
|---|---|---|
| EP | 2267655 | 12/2010 |
| JP | H11284837 | 10/1999 |

(Continued)

OTHER PUBLICATIONS

"Office Action of Japan Counterpart Application," dated May 28, 2019, with English translation thereof, p. 1-p. 6.

*Primary Examiner* — Li Liu
(74) *Attorney, Agent, or Firm* — JCIPRNET

(57) ABSTRACT

A density region setting unit sets a specific density region having a preset width with respect to a subject region of a radiation image. A compression processing unit performs a dynamic range compression process with respect to the radiation image on the basis of a first compression amount for compressing at least one of the maximum value or the minimum value among pixel values of the subject region into the specific density region and a preset second compression amount for compressing at least one of a high-density region or a low-density region in the specific density region, to generate a dynamic range compression image.

11 Claims, 7 Drawing Sheets

(56) References Cited

U.S. PATENT DOCUMENTS

| | | | |
|---|---|---|---|
| 2004/0070778 A1 | 4/2004 | Matama | |
| 2005/0180629 A1* | 8/2005 | Masuno | G06T 5/009 382/169 |
| 2005/0254707 A1* | 11/2005 | Takahashi | G06T 5/009 382/169 |
| 2007/0269132 A1* | 11/2007 | Duan | G06T 5/007 382/274 |
| 2009/0180714 A1* | 7/2009 | Takahashi | G06T 5/009 382/307 |
| 2010/0329533 A1 | 12/2010 | Omi | |
| 2011/0292246 A1* | 12/2011 | Brunner | G06T 5/009 348/231.99 |
| 2012/0014585 A1* | 1/2012 | Morita | G06T 7/11 382/132 |
| 2014/0294313 A1* | 10/2014 | Su | H04N 19/86 382/239 |
| 2015/0029327 A1* | 1/2015 | Abe | G02B 21/365 348/80 |
| 2016/0140708 A1* | 5/2016 | Nakamura | A61B 6/5205 382/128 |
| 2016/0171691 A1* | 6/2016 | Nakamura | A61B 6/505 382/132 |
| 2016/0210744 A1* | 7/2016 | Nakamura | G06T 5/009 |

FOREIGN PATENT DOCUMENTS

| | | |
|---|---|---|
| JP | 2003310589 | 11/2003 |
| JP | 2009-169592 | 7/2009 |
| JP | 2009-239975 | 10/2009 |
| JP | 2011005050 | 1/2011 |
| JP | 2015-66170 | 4/2015 |

* cited by examiner

FIG. 8
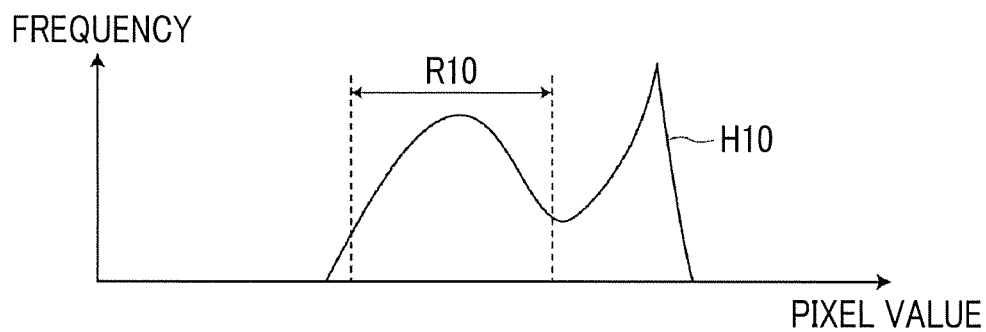
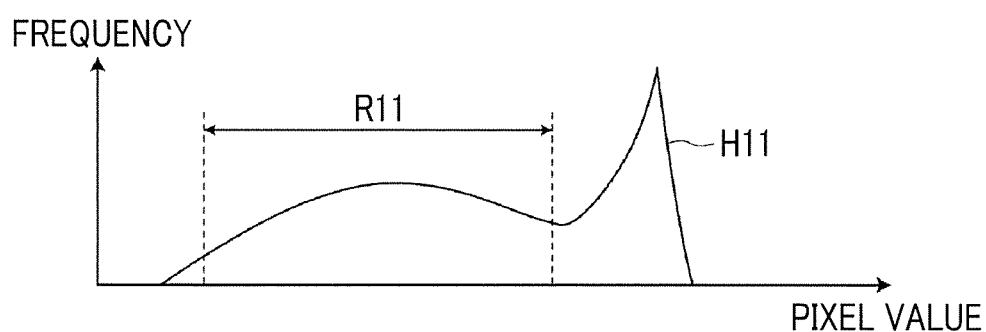
FIG. 9
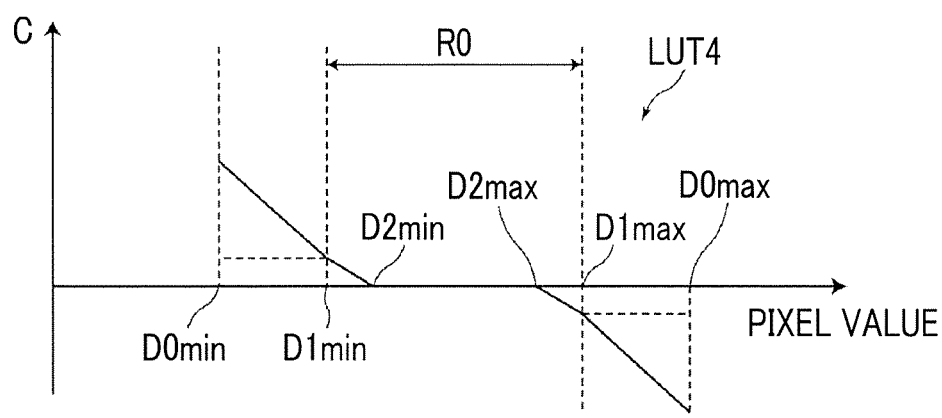

IMAGE PROCESSING APPARATUS, IMAGE PROCESSING METHOD, AND IMAGE PROCESSING PROGRAM FOR PERFORMING DYNAMIC RANGE COMPRESSION PROCESS

CROSS REFERENCE TO RELATED APPLICATIONS

The present application claims priority under 35 U.S.C. § 119 to Japanese Patent Application No. 2016-170251 filed on Aug. 31, 2016. The above application is hereby expressly incorporated by reference, in its entirety, into the present application.

BACKGROUND

Field of the Invention

The present invention relates to an image processing apparatus, an image processing method, and an image processing program for performing a dynamic range compression process with respect to an input image.

Description of the Related Art

A radiation image used for image diagnosis is acquired by imaging in a computed radiography (CR) system or imaging using a radiation detector (flat panel detector (FPD)), but a dynamic range of the acquired radiation image is extremely wide. In a case where such a radiation image with a wide dynamic range is regenerated in an output device, in order to prevent halation of a low-density portion (high brightness portion) of an image and black defects of a high-density portion (low brightness portion), the dynamic range of the image is compressed so that the dynamic range of the image is narrowed in a density region capable of being output by the output device.

For example, a method for performing filtering using a filter with a certain mask size with respect to an input radiation image to generate a non-sharp mask image (hereinafter, referred to as a blurred image), applying a compression table in which a predetermined compression amount is set for each imaging portion with respect to the blurred image to generate a compressed component image, and adding the compressed component image to the radiation image to compress the dynamic range of the radiation image is performed. However, if such a predetermined compression table is used for each imaging portion, there is a case where it is not possible to prevent halation and black defects according to models of subjects. For example, since a radiation image of a subject of an obesity body type has a wide density region compared with that of a radiation image of a subject of a standard body type, it is not possible to sufficiently compress the dynamic range of the input image only using the predetermined compression table, and thus, it is not possible to prevent the occurrence of halation and black defects.

Accordingly, a method for setting a compression table according to an input radiation image has been proposed. For example, JP2009-169592A has proposed a method for setting at least two input pixel values in an input radiation image, setting output pixel values with respect to the respective input pixel values, and generating a compression table in which the input pixel values are equal to the output pixel values and an inclination of a conversion function for compressing a dynamic range is equal to a predetermined value, thereby converting a subject region into an optimal density range while maintaining the density and the contrast of a region of interest in the radiation image. JP2015-66170A has proposed a method for determining a density region of a target region and an output density region in an input radiation image, and appropriately changing, in a case where the output density region is changed, a first density region used when a compression table is generated to generate a new compression table, to thereby acquire a radiation image without halation and black defects. Further, JP2009-239975A has proposed a method for extracting a subject region on the basis of a direct radiation region obtained by irradiating a radiation detector with direct radiation in an input radiation image and a region which is in contact with the direct radiation region with a predetermined width, and performing a dynamic range compression process with respect to an image in the subject region.

In this way, by performing a dynamic range compression process based on the density of an input radiation image, it is possible to convert a subject region into an optimal density range to obtain a radiation image in which halation or black defects are reduced.

SUMMARY

On the other hand, in a case where a dynamic range compression process is performed according to radiation images so that halation and black defects do not occur, a compression amount of a dynamic range varies according to types of subjects. For example, in a radiation image of a subject of a standard body type and a radiation image of a subject of an obesity body type, since a density region of the radiation image of the subject of the obesity body type has a wider range, compression amounts of the low-density portion and a high-density portion become larger than those of the radiation image of the subject of the standard body type. Accordingly, image quality varies in a processed radiation image acquired by performing a dynamic range compression process according to a radiation image and a processed radiation image acquired by performing a dynamic range compression process using a predetermined compression table for each imaging portion. Thus, in a case where a doctor reads the radiation image acquired by performing the dynamic range compression process using the predetermined compression table for each imaging portion, the radiation image acquired by performing the dynamic range compression process according to the radiation image has image quality different from image quality familiar to the doctor, which causes difficulties in reading.

Further, in order to prevent halation and black defects of a radiation image, in a case where a density region in which a gradation process is performed is widened, the contrast of a radiation image is lowered, which causes difficulties in medical diagnosis of a fine structure of a subject. Thus, it is desirable to prevent halation and black defects without reducing the contrast of a radiation image while maintaining image quality familiar to a doctor, regardless of a body type of a subject.

In consideration of the above problems, an object of the invention is to provide a technique for compressing a dynamic range of a radiation image while maintaining image quality familiar to a doctor.

According to an aspect of the invention, there is provided an image processing apparatus that performs a dynamic range compression process with respect to an input image, comprising: pixel value acquisition unit for acquiring at least one of a maximum value or a minimum value among pixel values of a subject region included in the input image; density region setting unit for setting a specific density region having a preset width with respect to the input image; and compression processing unit for performing the dynamic range compression process with respect to the input image, on the basis of a first compression amount for compressing the at least one of the maximum value or the minimum value among the pixel values of the subject region into the specific density region and a preset second compression amount for compressing at least one of a high-density region or a low-density region in the specific density region, to generate a dynamic range compression image.

The "subject region" refers to a region including an image of a subject based on radiation that passes through the subject in an input image. Specifically, an irradiation field region in a case where a subject is imaged using an irradiation field stop to obtain an input image, and a region obtained by removing a direct radiation region obtained by irradiating a radiation detector with direct radiation from a radiation image in an input image may be used as a subject region.

The "specific density region" refers to a density region with a uniform width (density range) regardless of the density (luminance) of an input image. As the "specific density region", for example, at least one of a density region based on a gradation table used for a gradation process to be performed with respect to an input image, a density region based on an imaging menu for defining a variety of imaging specifications in imaging of a subject, or a density region based on an imaging portion may be used. A central density of the specific density region may be changed according to the density of an input image. For example, the specific density region may be set so that the density of a region of interest in an input image is a central density of the specific density region.

The "low-density region" unit a density region between the lowest density in an image or a specific density region and a predetermined high density with respect to the lowest density.

The "high-density region" unit a density region between the highest density in an image or a specific density region and a predetermined low density with respect to the highest density.

The "preset second compression amount" refers to a compression amount which is preset with respect to the specific density region, without depending on the density (luminance) of the input image. The second compression amount may be set by a doctor who is a user that observes an image, for example, or may be uniquely set by an image processing apparatus. Further, the second compression amount may be set according to an imaging menu or an imaging portion.

In the image processing apparatus according to this aspect of the invention, the compression processing unit may perform a first dynamic range compression process using a first compression table based on the first compression amount and may perform a second dynamic range compression process using a second compression table based on the second compression amount, with respect to the input image, to generate the dynamic range compression image.

In this case, the image processing apparatus according to this aspect of the invention may include compression table generation unit for generating the first compression table.

The "first compression table based on the first compression amount" unit a compression table in which a compression amount of at least one a high-density region or a low-density region in an image is the first compression amount in a case where the dynamic range compression process is performed using the first compression table.

The "second compression table based on the second compression amount" unit a compression table in which a compression amount of at least one a high-density region or a low-density region in an image is the second compression amount in a case where the dynamic range compression process is performed using the second compression table.

Further, in the image processing apparatus according to this aspect of the invention, the compression processing unit may perform the dynamic range compression process using a compression table based on the first compression amount and the second compression amount, with respect to the input image, to generate the dynamic range compression image.

In this case, the image processing apparatus according to this aspect of the invention may further include compression table generation unit for generating the compression table.

In addition, the image processing apparatus according to this aspect of the invention may further include gradation processing unit for performing a gradation process using a preset gradation table with respect to the dynamic range compression image.

The "preset gradation table" refers to a gradation table by which the gradation process can be performed to obtain a gradation-processed image having a preset density and a preset contrast. For example, the gradation table may be set by a doctor who is a user who observes an image or may be uniquely set by an image processing apparatus. Further, the gradation table may be set according to an image menu or an imaging portion.

In this case, the density region setting unit may set a density region converted using the gradation table as the specific density region.

In addition, in the image processing apparatus according to this aspect of the invention, in a case where the input image is a motion picture including a plurality of frames, the density region setting unit may set the specific density region with respect to each of the plurality of frames, the pixel value acquisition unit may acquire at least one of a representative value of maximum values or a representative value of minimum values among pixel values of a subject region included in each of the plurality of frames, and the compression processing unit may perform the dynamic range compression process on the basis of the first compression amount and the second compression amount for compressing the at least one of the representative value of the maximum values or the representative value of the minimum values into the specific density region, in each of the plurality of frames, to generate the dynamic range compression image.

Here, the "representative value of the maximum values" and the "representative value of the minimum values" may be a maximum value and a minimum value of each of the plurality of frames. Further, an average value of maximum values and an average value of minimum values thereof of several frames before and after a target frame among the plurality of frames or all the frames of the plurality of frames may be calculated, and the average value of the maximum values and the average value of the minimum values may be respectively set as a representative value of maximum values of the target frame and a representative value of minimum values thereof. In addition, in a case where differences between the maximum value and the minimum value of the target frame and the average value of the maximum values and the average value of the minimum values are equal to or larger than a predetermined threshold value, the average value of the maximum values and the average value of the minimum values may be set as the representative value of the maximum values of the target frame and the representative value of the minimum values thereof.

Furthermore, in the image processing apparatus according to this aspect of the invention, the density region setting unit may set the specific density region according to at least one of an imaging menu in imaging a subject to acquire the input image or an imaging portion of the subject.

According to another aspect of the invention, there is provided an image processing method according to the invention is an image processing method for performing a dynamic range compression process with respect to an input image, the method comprising: acquiring at least one of a maximum value or a minimum value among pixel values of a subject region included in the input image; setting a specific density region having a preset width with respect to the input image; and performing the dynamic range compression process with respect to the input image, on the basis of a first compression amount for compressing the at least one of the maximum value or the minimum value among the pixel values of the subject region into the specific density region and a preset second compression amount for compressing at least one of a high-density region or a low-density region in the specific density region, to generate a dynamic range compression image.

According to still another aspect of the invention, there is provided a program that causes a computer to execute the image processing method according to the invention.

According to the invention, at least one of a maximum value or a minimum value among pixel values of a subject region included in an input image is acquired, a specific density region is set with respect to the input image, and a dynamic range compression process is performed with respect to the input image on the basis of a first compression amount for compressing the at least one of the maximum value or the minimum value among the pixel values of the subject region into the specific density region and a preset second compression amount for compressing at least one of a high-density region or a low-density region in the specific density region. Here, the density region of the input image is compressed into the specific density region with a preset width by the dynamic range compression process on the basis of the first compression amount. Thus, it is possible to prevent halation and black defects in the dynamic range processed image. Further, the input image which is compressed into the specific density region with the preset width is further compressed by the dynamic range compression process on the basis of the second compression amount. Thus, it is possible to obtain a preset contrast in the dynamic range compression image. Accordingly, according to the invention, it is possible to prevent halation and black defects and to generate a dynamic range compression image with the preset contrast.

BRIEF DESCRIPTION OF THE DRAWINGS

FIG. 8 is a diagram showing a histogram of radiation images of a subject of a standard body type and a subject of an obesity body type.

FIG. 9 is a diagram showing a combined compression table.

DETAILED DESCRIPTION

Figure 1:
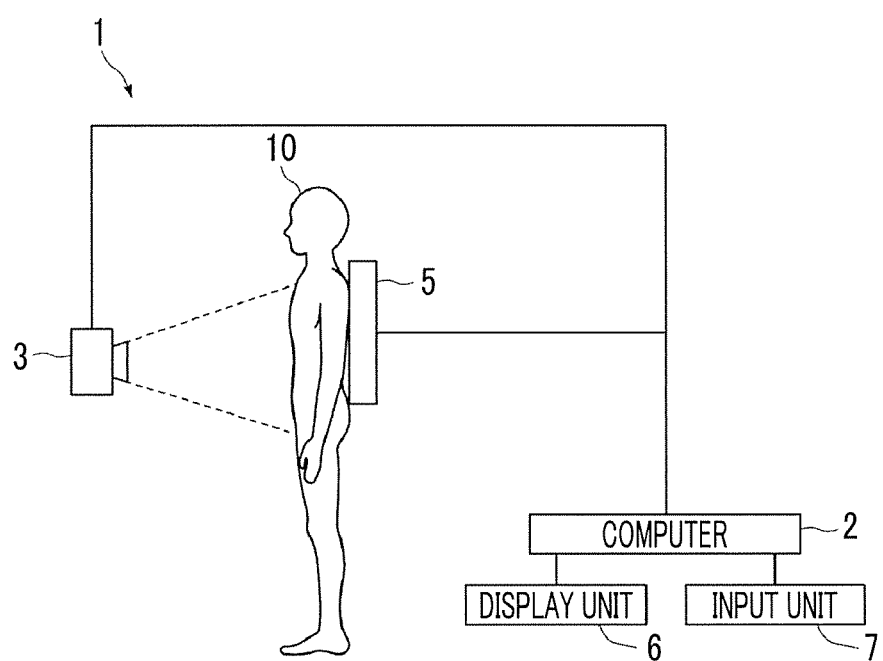
FIG. 1 is a schematic block diagram showing a configuration of a radiation imaging system to which an image processing apparatus according to an embodiment of the invention is applied.

Hereinafter, an embodiment of the invention will be described with reference to the accompanying drawings. FIG. 1 is a schematic block diagram showing a configuration of a radiation imaging system to which an image processing apparatus according to an embodiment of the invention is applied. As shown in FIG. 1, the radiation imaging system according to this embodiment performs a variety of image processing including a dynamic range compression process with respect to a radiation image of a subject, and as shown in FIG. 1, includes an imaging device 1 and a computer 2 that includes the image processing apparatus according to this embodiment.

The imaging device 1 includes an X-ray source 3 which is radiation source that irradiates a subject 10 with X-rays, and a radiation detector 5 that detects the X-rays that pass through the subject 10 to acquire a radiation image of the subject 10.

The radiation detector 5 is able to repeatedly perform recording and reading of the radiation image. The radiation detector 5 may employ a so-called direct-type radiation detector that directly receives irradiation of radiation to generate electric charges, or may employ a so-called indirect-type radiation detector that first converts radiation into visible light and converts the visible light into an electric charge signal. Further, as a reading method of a radiation image signal, it is preferable to use a so-called TFT reading method for reading a radiation image signal by turning on or off a thin film transistor (TFT) switch, or to use a so-called optical reading method for reading a radiation image signal using irradiation of reading light, the invention is not limited thereto, and may use other methods.

Figure 2:
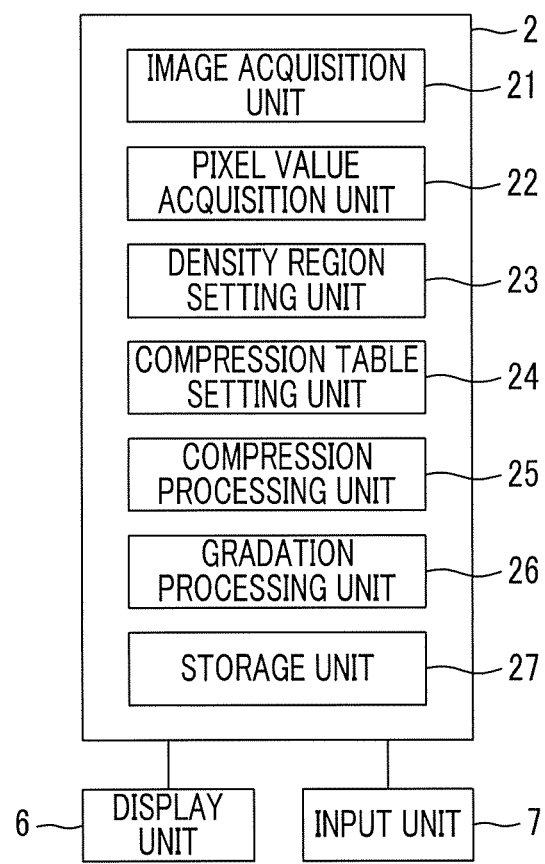
FIG. 2 is a schematic block diagram showing a configuration of the image processing apparatus.

A computer 2 includes a central processing unit (CPU), a semiconductor memory, a communication interface, a storage device such as a hard disk drive or a solid-state drive (SSD), and the like. As illustrated in FIG. 2, an image acquisition unit 21, a pixel value acquisition unit 22, a density region setting unit 23, a compression table generation unit 24, a compression processing unit 25, a gradation processing unit 26, and a storage unit 27 in the image processing apparatus according to this embodiment are formed by the hardware.

A display unit 6 that includes a high-accurate liquid crystal display or the like that performs displaying of an image or the like, and an input unit 7 that receives an input from an operator are connected to the computer 2. The input unit 7 includes a keyboard, a mouse, or a touch panel-type input unit, or the like, which is an interface that receives various inputs necessary for a radiation imaging system, such as an imaging command, an image processing command, or designation of an imaging menu from an operator.

Processes performed by the image acquisition unit 21, the pixel value acquisition unit 22, the density region setting unit 23, the compression table generation unit 24, the compression processing unit 25, the gradation processing unit 26 are performed by a central processing unit based on a computer program stored in the storage unit 27. A plurality of processing units or processing circuits that perform the respective processes of the respective units may be provided in the computer 2.

The image acquisition unit 21 acquires a radiation image G0 (input image) acquired by the radiation detector 5 as digital data. The radiation image G0 may be a simple radiation image in the radiation imaging system shown in FIG. 1, or may be a tomography image. The tomography image may be, for example, a computed tomography (CT) image or a magnetic resonance imaging (MRI) image. Further, the tomography image may be a tomosynthesis image obtained by moving a radiation source to irradiate a subject with radiation from a plurality of radiation source positions for imaging and adding up a plurality of projected images acquired in this way, in which a desired tomography plane is emphasized. In addition, the radiation image G0 may be a so-called energy subtraction image obtained by irradiating the subject 10 with radiations having different energies to obtain a plurality of radiation images based on the respective radiations having different energies, appropriately weighting the plurality of radiation images, and calculating a difference therebetween to extract a specific substructure of the subject 10.

Figure 3:
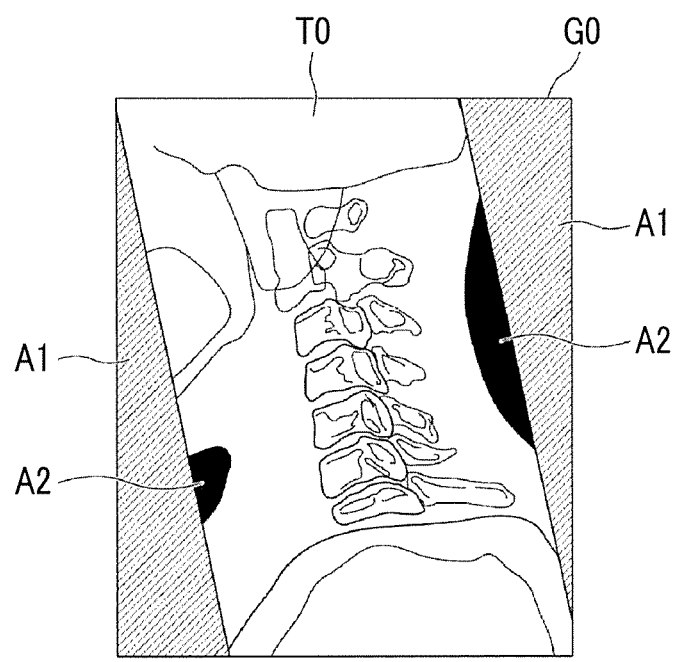
FIG. 3 is a diagram showing an irradiation field outside region and a direct radiation region in a radiation image.

The pixel value acquisition unit 22 acquires a maximum value D0max and a minimum value D0min of a subject region T0 included in the radiation image G0. First, the pixel value acquisition unit 22 removes a direct radiation region and an irradiation field outside region from the radiation image G0 to calculate a subject region. Specifically, as shown in FIG. 3, the pixel value acquisition unit 22 recognizes an irradiation field outside region A1 and a direct radiation region A2 in the radiation image G0 and removes the irradiation field outside region A1 and the direct radiation region A2 from the radiation image G0 to calculate the subject region T0. Further, the pixel value acquisition unit 22 acquires the maximum value D0max and the minimum value D0min among pixel values in the subject region T0.

Here, the direct radiation region is a region on the radiation image G0 which is acquired by directly irradiating the radiation detector 5 with radiation. The irradiation field outside region refers to a region outside an irradiation field region included in the radiation image G0 in a case where imaging is performed using an irradiation field stop. The pixel value acquisition unit 22 recognizes the irradiation field outside region and the direct irradiation region in the radiation image G0 using a determiner that determines the irradiation field outside region and the direct radiation field in the radiation image G0. The determiner is generated through machine learning using multiple radiation images including the irradiation field outside region and the direct irradiation region. As a feature value in the machine learning, an average value, a variance value, or the like of pixel values in a peripheral region including a target pixel in each radiation images may be used.

The pixel value acquisition unit 22 may recognize a irradiation field outside region using a method for scoring an irradiation field likeliness by a pattern of the target pixel and the pixel values of the peripheral pixels, for example, as disclosed in JP2009-169592A, to calculate an irradiation field region. Further, the pixel value acquisition unit 22 may remove a subject region which is in contact with the direct radiation region at a predetermined width from the radiation image G0 as disclosed in JP2009-169592A, in addition to the direct radiation region and the irradiation field outside region, to calculate the subject region T0.

Figure 4:
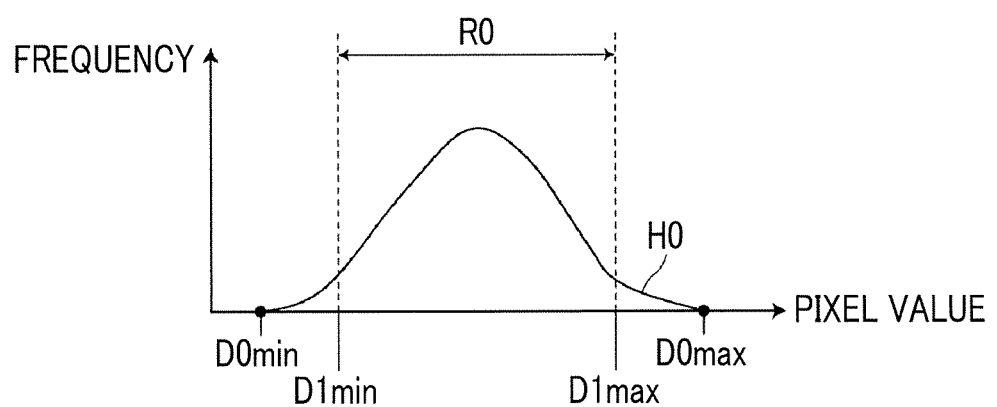
FIG. 4 is a diagram illustrating setting of a specific density region.

The density region setting unit 23 sets a specific density region having a preset width with respect to the radiation image G0. FIG. 4 is a diagram illustrating setting of a specific density region. First, the density region setting unit 23 creates a histogram H0 of the subject region T0 in the radiation image G0. The histogram H0 includes a maximum value D0max and a minimum value D0min. Further, in the following description, a transverse axis of the histogram represents a pixel value, and a longitudinal axis thereof represents a frequency. Further, the density region setting unit 23 sets a specific density region R0 with the preset width to the histogram H0. The specific density region R0 includes a maximum value D1max and a minimum value D1min in the histogram H0. Here, the specific density region R0 in this embodiment is a density region in which a density range which corresponds to a density width is uniform regardless of the density (luminance) of the radiation image G0. Specifically, the width of the specific density region R0 may be the width of a density of which gradation is converted in a gradation conversion process (which will be described later). In addition, the width of the specific density region R0 may be set according to an imaging portion of the subject 10 or an imaging menu for defining a variety of imaging methods.

In this embodiment, the density region setting unit 23 analyzes the histogram H0 to set the specific density region R0 on the histogram H0. Specifically, the density region setting unit 23 calculates an average value or a median value of the subject region T0, and sets the specific density region R0 so that a central value of the specific density region R0 matches a pixel value of which the calculated value is equal to a predetermined value.

Here, a region of interest may be recognized using an arbitrary method such as a method for recognizing the region of interest from the histogram H0 or a method for recognizing the region of interest from a two-dimensional structure of the subject region T0. Since the region of interest may vary for each imaging portion, the region of interest may be recognized using a desired method from various methods, on the basis of an imaging portion input through the input unit 7. Further, as disclosed in JP2009-169592A, in a case where the imaging portion corresponds to the cervical spine, by extracting a contour line of a main region in the subject region T0, it is possible to recognize the region of interest in the cervical vertebrae. Further, for example, in a case where the imaging portion corresponds to the chest, by defining a region from a spatial position relationship in an image, it is possible to recognize a region of interest in a lung field with high accuracy.

Further, a bone region or a soft part region in the subject region T0 may be extracted, and the bone region or the soft part region may be recognized as the region of interest. As a method for extracting the bone region, for example, as disclosed in JP2015-019996A, a known arbitrary method such as a method for extracting a region having a density which is equal to or lower than a reference density as the bone region from the subject region using the fact that the density of the bone region is lower than the density of the other region, that is, the soft part region (luminance is higher), or a method for extracting a contour of the bone may be used. Further, as disclosed in JP4844560B, the bone region may be extracted on the basis of bone edges or the like included in the subject region, using a variety of image processing for performing skeletonization such as top hat processing or skeleton processing. Further, the bone region may be extracted by an edge detection method based on a Laplacian filter, a line extracting filter, or the like. In addition, in a case where a plurality of methods are used, results of the plurality of methods may be combined on the basis of predetermined weights to extract the bone region. In this case, a method for determining the combination according to a neural network may be used. By removing the extracted bone region from the subject region, it is possible to extract the soft part region. Furthermore, in a case where the subject 10 corresponds to the breast, a mammary gland region in the subject region T0 may be extracted, and the breast region may be recognized as the region of interest.

Figure 5:
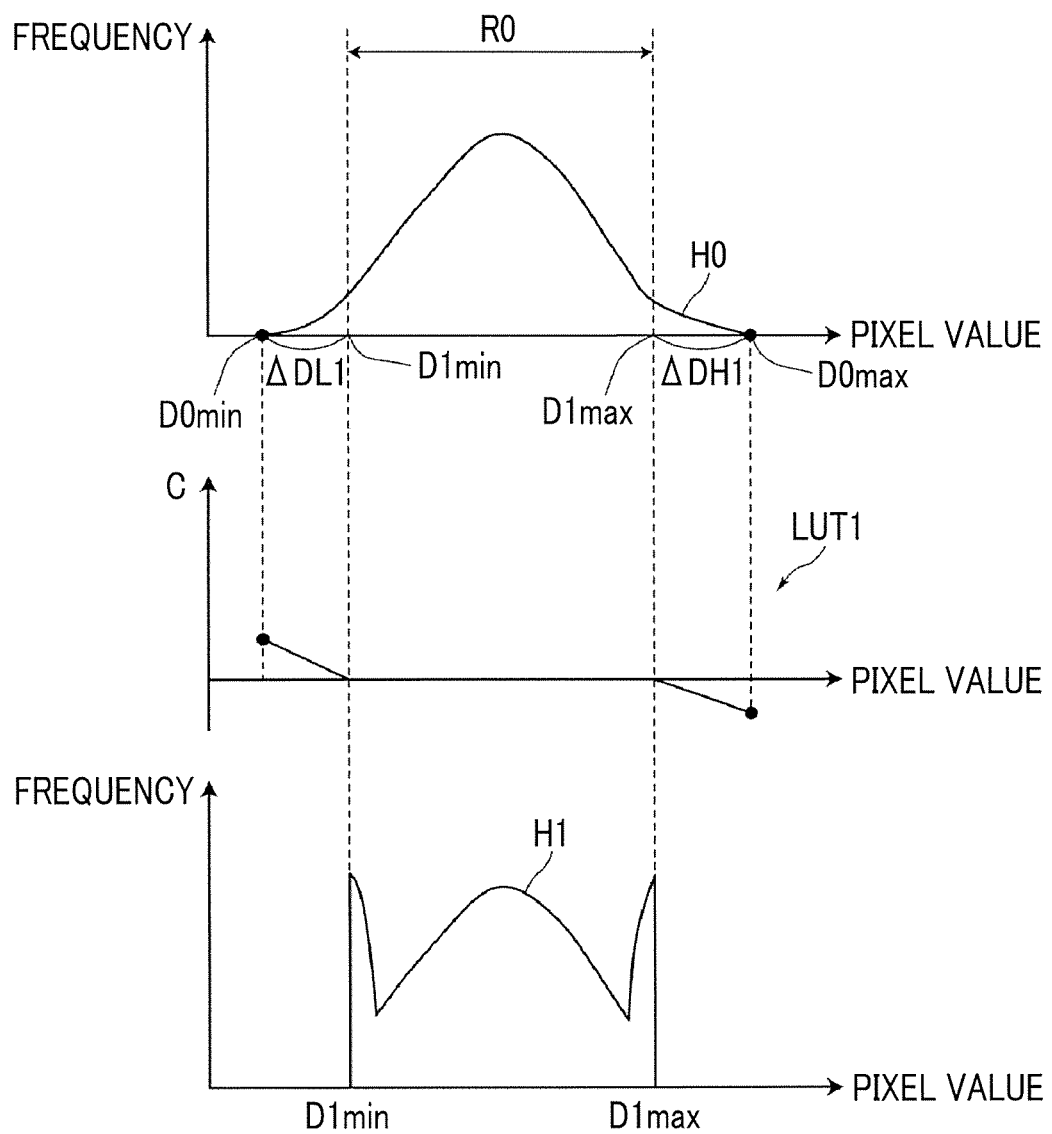
FIG. 5 is a diagram illustrating generation of a first compression table.

The compression table generation unit 24 generates a first compression table based on a first compression amount for compressing the maximum value D0max and the minimum value D0min among the pixel values of the subject region T0 into the specific density region R0. FIG. 5 is a diagram illustrating generation of the first compression table. As shown in FIG. 5, the compression table generation unit 24 generates a first compression table LUT1 for compressing a density region from the minimum value D0min of the histogram H0 to the minimum value D1min of the specific density range R0 and a density region from the maximum value D0max of the histogram H0 to the maximum value D1max of the specific density region R0 into the specific density region R0. Here, in FIG. 5, a transverse axis of the first compression table LUT1 represents a pixel value of an image relating to a low frequency component of the radiation image G0 (which will be described later) and a longitudinal axis thereof represents an output value of the first compression table LUT1, that is, a pixel value obtained by converting the pixel value of the image relating to the low frequency component of the radiation image G0 using the first compression table LUT1. The longitudinal axis is indicated by "C" in accordance with Expression (1) (which will be described later). In FIG. 5, a linear first compression table LUT1 is shown, but a first compression table LUT1 which is a non-linear function may be used.

Here, in this embodiment, it is assumed that the dynamic range compression process is performed using a method disclosed in JP1998-75364A (JP-H10-75364A), for example. As shown in the following Expression (1), the method disclosed in JP1998-75364A (JP-H10-75364A) is a method for creating a plurality of band-limited images from a radiation image, acquiring an image relating to a low frequency component of a radiation image on the basis of the band-limited images, and adding an output value obtained by converting the pixel value of the image relating to the low frequency component using a compression table to the radiation image to perform the dynamic range compression process.

$$S_{proc} = S_{org} + C(S_{org} - F_{drc}(S_{org}, S_{us1}, S_{us2}, \ldots, S_{usn})) \quad (1)$$

$$F_{drc} = (S_{org}, S_{us1}, S_{us2}, \ldots, S_{usn})$$
$$= \{f_{d1}(S_{org} - S_{us1}) + f_{d2}(S_{us1} - S_{us2}) + \ldots + f_{dk}(S_{usk-1} - S_{usk}) + \ldots + f_{dn}(S_{usn-1} - S_{usn})\}$$

$S_{proc}$: dynamic range compression image
$S_{org}$: radiation image before processing
$S_{usk}$ (k=1 to n): blurred image for each frequency band
$f_{dk}$ (k=1 to n): function used for obtaining image indicating low frequency component
C( ): function based on compression table The dynamic range compression process is not limited to the above Expression (1), and a method shown in the following Expression (2) may be used.

$$S_{proc} = S_{org} + C(S_{us}) \quad (2)$$

$$S_{us} = \Sigma(S_{org})/M^2$$

$S_{proc}$: dynamic range compression image
$S_{org}$: radiation image before processing
C( ): function based on compression table $S_{org} - F_{drc}(S_{org}, S_{us1}, S_{us2}, \ldots, S_{usn})$ in Expression (1) and $S_{us}$ in Expression (2) respectively correspond to an image relating to a low frequency component of a radiation image.

Here, the size of an inclination in the first compression table LUT1 is −1 on a low-density side and is −1 on a high-density side. The size may be a value larger than −1 according to a relationship between a specific density region and a density region to which a gradation process is applied. Specifically, in a case where the specific density region is narrower than the density region in which the gradation process is provided, the size may be set to a value such as −0.95 which is slightly larger than −1. In a case where the output value obtained by converting the pixel value of the image relating to the low frequency component of the radiation image G0 using the first compression table LUT1 shown in FIG. 5 is set as C1, by adding the output value C1 to the radiation image G0 and performing the dynamic range compression process, a density width ΔDL1 from the minimum value D0min of the histogram H0 to the minimum value D1min of the specific density region R0 is compressed into the specific density region R0 on the low-density side, and a density width ΔDH1 from the maximum value D0max of the histogram H0 to the maximum value D1max of the specific density region R0 is compressed into the specific density region R0 on the high-density side. A histogram H1 of the radiation image G0 after the dynamic range compression process using the first compression table LUT1 is performed is shown in FIG. 5.

Figure 6:
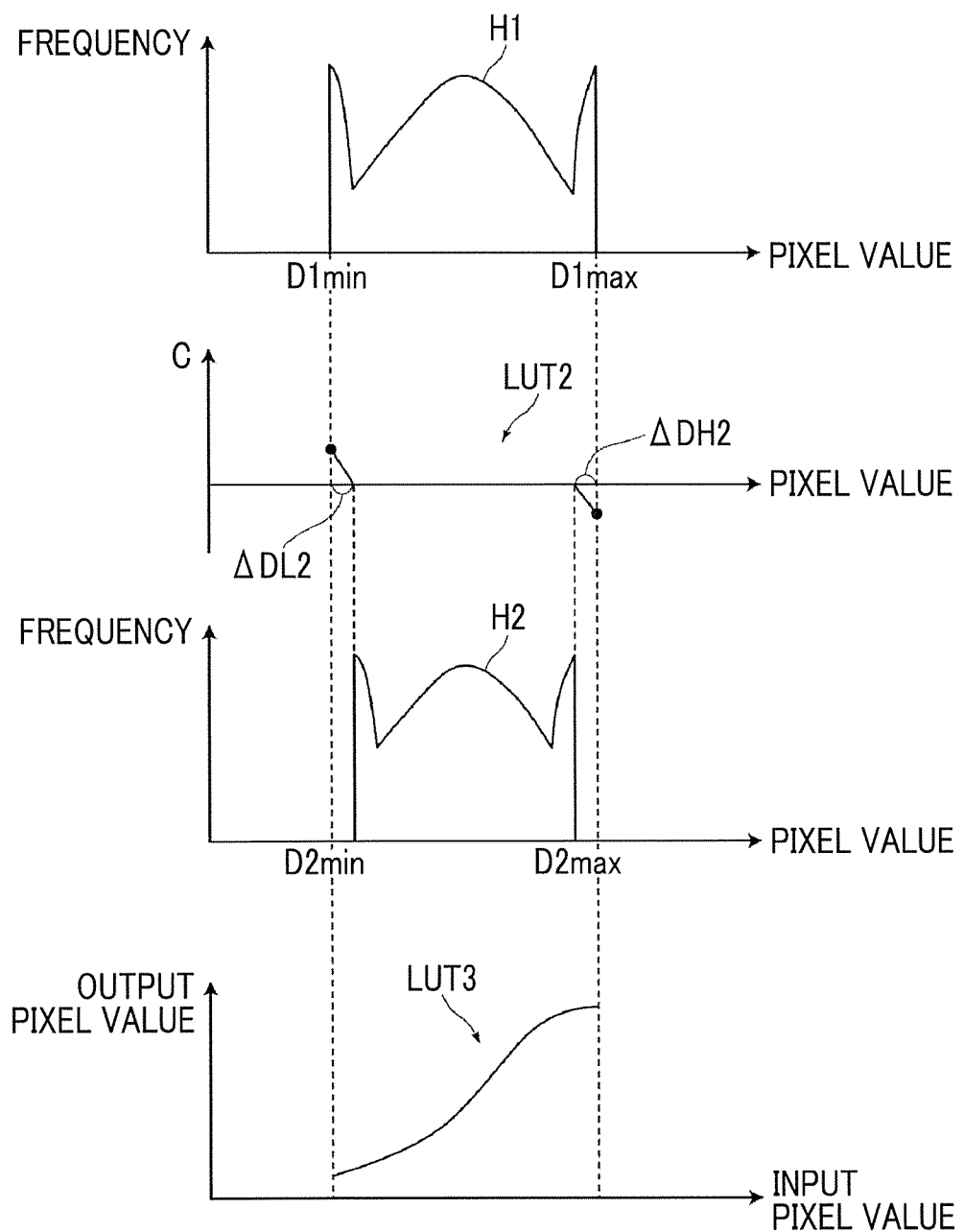
FIG. 6 is a diagram showing a second compression table.

On the other hand, in this embodiment, a second compression table LUT2 based on a preset second compression amount for compressing a high-density region and a low-density region in the specific density region R0 is stored in the storage unit 27. FIG. 6 is a diagram showing the second compression table. As shown in FIG. 6, the second compression table LUT2 is set to have a predetermined inclination on both of a low-density side and a high-density side. In FIG. 6, a transverse axis of the second compression table LUT2 represents a pixel value of an image relating to a low frequency component of a radiation image G0, and a longitudinal axis thereof represents an output value of the second compression table LUT2, that is, a pixel value obtained by converting the pixel value of the image relating to the low frequency component of the radiation image G0 using the second compression table LUT2. The second compression table LUT2 may have the same inclination or different inclinations on the high-density side and the low-density side.

In a case where the output value obtained by converting the pixel value of the image relating to the low frequency component of the radiation image G0 using the second compression table LUT2 shown in FIG. 6 is set as C2, by adding the output value C2 to the radiation image G0 for which the dynamic range compression process is performed by the first compression table LUT1 and performing the dynamic range compression process, a density width ΔDL2 from the minimum value D1min of the histogram H1 to the minimum value D2min is compressed on the low-density side, and a density width ΔDH2 from the maximum value D1max of the histogram H1 to the maximum value D2max is compressed on the high-density side. A histogram H2 of the radiation image G0 after the dynamic range compression process using a second compression table LUT2 is performed is shown in FIG. 6. A linear second compression table LUT2 is shown in FIG. 6, but the second compression table LUT2 which is a non-linear function may be used.

Here, in this embodiment, according to imaging menus for defining imaging portions of the subject 10 or a variety of imaging specifications, a plurality of second compression tables LUT2 which are created in advance based on a variety of second compression amounts are stored in the storage unit 27. The compression processing unit 25 (which will be described later) may select and read the second compression table LUT2 to be used for the dynamic range compression process from the storage unit 27 according to the imaging portion or the imaging menu, and may use the second compression table LUT2 for the dynamic range compression process. The second compression table LUT2 may be specific to an apparatus. Further, a second compression table LUT2 generated by each doctor who observes a radiation image and performs medical diagnosis may be stored in the storage unit 27, and may be used for the dynamic range compression process.

In FIG. 6, a gradation table LUT3 to be used for a gradation process in the gradation processing unit 26 (which will be described later) is shown. In the gradation table LUT3 shown in FIG. 6, a transverse axis shows an input pixel value, and a longitudinal axis represents an output pixel value. The gradation table LUT3 is used to convert a gradation of the radiation image G0, that is, the subject region T0 in the specific density region R0. A plurality of gradation tables LUT3 are stored in the storage unit 27 according to an imaging portion of the subject 10 or an imaging menu. The gradation processing unit 26 (which will be described later) reads the gradation table LUT3 to be used in the gradation process from the storage unit 27 according to the imaging portion or the imaging menu, and uses the gradation table LUT3 for the gradation process. The gradation table LUT3 may be specific to an apparatus. Further, a gradation table LUT3 generated by each doctor who observes a radiation image and performs medical diagnosis may be stored in the storage unit 27, and may be used for the gradation process.

The compression processing unit 25 performs the dynamic range compression process with respect to the radiation image G0 using the first compression table LUT1 and the second compression table LUT2. First, the compression processing unit 25 converts the pixel value of the image relating to the low frequency component of the subject region T0 in the radiation image G0 using the first compression table LUT1 to calculate the output value C1, and adds the output value C1 to the radiation image G0 to perform the dynamic range compression process, to thereby generate an image G1 which is intermediately processed. The histogram H1 of the intermediately processed image G1 is shown in FIG. 5. In this case, in Expression (1), $S_{org}$ corresponds to the radiation image G0 in the subject region T0, and $S_{proc}$ corresponds to the median-processed image G1, and C( ) corresponds to a function based on the first compression table LUT1. Then, the compression processing unit 25 converts the pixel value of the image relating to the low frequency component of the subject region T0 in the radiation image G0 using the second compression table LUT2 to calculate the output value C2, and adds the output value C2 to the radiation image G1 to perform the dynamic range compression process, to thereby generate a dynamic range compression image G2. The histogram H2 of the dynamic range compression image G2 is shown in FIG. 6. In this case, in [Expression 1], $S_{org}$ of the first term on the right side corresponds to the intermediately processed image G1, $S_{org}$ of the second term corresponds to the radiation image G0, $S_{proc}$ corresponds to the dynamic range compression image G2, and C( ) corresponds to a function based on the second compression table LUT2.

The compression processing unit 25 may perform the dynamic range compression process without generating the intermediately processed image G1. That is, with respect to the pixel values of the image relating to the low frequency component of the subject region T0 in the radiation image G0, the compression processing unit 25 may calculate the output value C1 and the output value C2 based on the first compression table LUT1 and the second compression table LUT2, may add up the output value C1 and the output value C2, and may add the output value (C1+C2) to the radiation image G0, to perform the dynamic range compression process. A dynamic range compression image obtained by adding the output value (C1+C2) to the radiation image G0 is equivalent to the dynamic range compression image G2 obtained by adding the output value C2 to the intermediately processed image G1.

The gradation processing unit 26 performs a gradation process with respect to the dynamic range compression image G2 using a gradation table LUT3 to generate a processed image G3. In the gradation processing unit 26, other image processes such as frequency processing and a noise removing process may be performed. Further, a processing unit that performs frequency processing, a noise removing process, and the like may be provided separately from the gradation processing unit 26.

Figure 7:
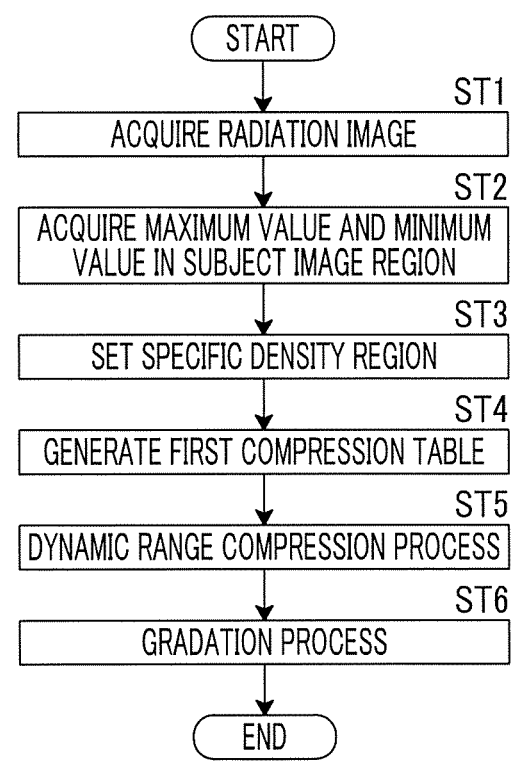
FIG. 7 is a flowchart showing processes performed in an embodiment of the invention.

Next, processes performed in this embodiment will be described. FIG. 7 is a flowchart showing processes performed in this embodiment. It is assumed that imaging of the subject 10 is completed. First, the image acquisition unit 21 acquires the radiation image G0 from the radiation detector 5 (step ST1), and the pixel value acquisition unit 22 acquires the maximum value D0max and the minimum value D0min of the subject region T0 included in the radiation image G0 (step ST2). Then, the density region setting unit 23 sets the preset specific density region R0 with respect to the subject region T0 of the radiation image G0 (step ST3). Then, the compression table generation unit 24 generates the first compression table LUT1 (step ST4). Then, the compression processing unit 25 performs a dynamic range compression process with respect to the radiation image G0 using the first and second compression tables LUT1 and LUT2 to obtain the dynamic range compression image G2 (step ST5). Subsequently, the gradation processing unit 26 performs a gradation process with respect to the dynamic range compression image G2 to acquire a processed image G3 (step ST6), and then, the procedure is terminated.

Here, the dynamic range compression process disclosed in JP2009-169592A depends on the density of a radiation image. FIG. 8 is a diagram showing a histogram of a radiation image acquired by imaging a subject of a standard body type and a histogram of a radiation image acquired by imaging a subject of an obesity body type. As shown in FIG. 8, in comparison of a histogram H10 of a radiation image acquired by imaging a subject of a standard body type and a histogram H11 of a radiation image acquired by imaging a subject of an obesity body type, the latter radiation has a wider density distribution range. Thus, in a case where a density region in which the gradation process is performed is determined on the basis of a histogram of a radiation image, the radiation image acquired by imaging the subject of the obesity body type has a lower contrast, and thus, it is difficult for a doctor to perform diagnosis.

In this embodiment, the dynamic range compression process is performed with respect to the radiation image G0 using the first compression table LUT1 based on the first compression amount for compressing the maximum value D0max and the minimum value D0min of the pixel values of the subject region T0 into the specific density region R0 having a uniform width, regardless of the density of the radiation image G0, and the second compression table LUT2 based on the preset second compression amount for compressing at least one of the high-density region or the low-density region in the specific density region R0. Here, the density region of the radiation image G0 is compressed into the specific density region R0 having the preset width using the dynamic range compression process based on the first compression amount. Thus, it is possible to prevent occurrence of halation and black defects in the dynamic range compression image G2. Further, the radiation image G0 which is compressed into the specific density region R0 having the preset width is further compressed using the dynamic range compression process based on the second compression amount. Thus, a preset contrast is obtained in the dynamic range compression image G2. Accordingly, according to this embodiment, it is possible to generate the dynamic range compression image G2 with the preset contrast while preventing halation and black defects.

Further, since the gradation process is performed with respect to a dynamic range compression image using a preset gradation table, the gradation process is performed with respect to an image of the specific density region R0 in a preset density range. Accordingly, it is possible to set the processed image G3 to have a preset density and a preset contrast.

In the above-described embodiment, the compression processing unit 25 performs the dynamic range compression process with respect to the radiation image G0 using the first compression table LUT1, and then, performs the dynamic range compression process using the second compression table LUT2 to generate the dynamic range compression image G2. However, the compression generation unit 24 may generate a single combined compression table LUT4 obtained by combining the first compression table LUT1 and the second compression table LUT2. FIG. 9 is a diagram showing the combined compression table LUT4. In this way, by generating one combined compression table LUT4 and performing the dynamic range compression process using the combined compression table LUT4, the compression processing unit 25 can generate the dynamic range compression image G2 only by performing a one-time process with respect to the radiation image G0. Thus, it is possible to reduce a computation amount to rapidly perform the process.

In the above-described embodiment, the dynamic range compression process may also be performed with respect to a motion picture in a similar way. The motion picture is formed by connecting a plurality of frames in a time series manner. Thus, by considering each frame as one image and performing the dynamic range compression process and the gradation process with respect to each of the frames that form the motion picture in a similar way to the above-described embodiment, it is possible to perform the dynamic range compression process and the gradation process with respect to the motion picture. In this case, the dynamic range compression process may be performed by acquiring a maximum value and a minimum value of the subject region T0 with respect to each of the plurality of frames. In this case, the maximum value and the minimum value become a representative value of maximum values and a representative value of minimum values, respectively.

Further, maximum values and minimum values of a target frame which is a target to be processed among a plurality of frames and some frames before and after the target frame may be acquired, an average value of the maximum values of the frames and an average value of the minimum values thereof may be calculated, and the average value of the maximum values and the average value of the minimum values calculated in this way may be set as a maximum value and a minimum value of the target frame. Further, an average value of maximum values of a plurality of frames and an average value of minimum values thereof may be calculated, and the average value of the maximum values and the average value of the minimum values calculated in this way may be set as a maximum value and a minimum value of the target frame. In these cases, in a case where differences between the maximum value and the minimum value of the target frame and the average value of the maximum values and the average value of the minimum values are equal to or larger than a predetermined threshold value, the average value of the maximum values and the average value of the minimum values may be set as a representative value of the maximum values of the target frame and a representative value of the minimum values thereof. In this case, the average value of the maximum values and the average value of the minimum values become the representative value of the maximum values and the representative value of the minimum values, respectively. In this way, by performing the dynamic range compression process and the gradation process using the average value of the maximum values and the average value of the minimum values, it is possible to prevent scattering in density between frames, and thus, it is possible to prevent discomfort in reproducing a processed motion picture.

Further, in the above-described embodiment, the maximum value and the minimum value of the subject region T0 are obtained, and the dynamic range compression process is performed in both a high-density side and a low-density side of the radiation image G0. However, one of the maximum value and the minimum value of the subject region T0 may be acquired, and the dynamic range compression process may be performed in only one of the high-density side and the low-density side of the radiation image G0. In this case, only one of the high-density side and the low-density side may be compressed based on the first compression amount and the second compression amount. Further, only one of the high-density side and the low-density side may be compressed based on the first compression amount, and the other one of the high-density side and the low-density side may be compressed based on the second compression amount. For example, only the high-density side may be compressed based on the first compression amount, and only the low-density side may be compressed based on the second compression amount.

In addition, in the above-described embodiment, the image processing apparatus includes the gradation processing unit 26, but the gradation processing unit 26 may be separately provided from the image processing apparatus of the embodiment, that is, the computer 2, and the gradation process may be performed in the gradation processing unit 26 which is separately provided.

Further, in the above-described embodiment, the image processing apparatus includes the compression table generation unit 24, but the compression table generation unit 24 may be provided separately from the image processing apparatus in this embodiment, that is, the computer 2, and the first compression table LUT1 or the combined compression table LUT4 may be generated in the compression table generation unit 24 which is separately provided.

In the above-described embodiment, a radiation image of the subject 10 is acquired using the radiation detector 5, but a part of radiation energy may be accumulated by irradiation of radiation, and then, a radiation image may be acquired using a storage phosphor sheet that employs storage phosphor that emits photostimulated luminescence light according to the accumulated radiation energy by irradiation of exciting light such as visible light or laser light. In a case where the storage phosphor sheet is used, radiation that passes through a subject is irradiated to the storage phosphor sheet, and thus, radiation image information is stored and recorded once. Further, exciting light is irradiated to the storage phosphor sheet to generate photostimulated luminescence light. Then, the photostimulated luminescence light is photoelectrically converted to acquire a radiation image.

Furthermore, in the above-described embodiment, the dynamic range compression process is performed using a radiation image as a target, but the invention may also be applied to a case where the dynamic range compression process is performed using an image acquired by a digital camera or the like as a target.

Hereinafter, effects of this embodiment will be described.

By performing the dynamic range compression process with respect to an input image using the compression table based on the first compression amount and the second compression amount, it is possible to generate a dynamic range compression image in a one-time process, and thus, it is possible to reduce a computation amount, to thereby perform a rapid process.

By performing the gradation process using a preset gradation table with respect to the dynamic range compression image, it is possible to perform the gradation process with respect to an image of a specific density region in a preset density range, and thus, it is possible to set the gradation-processed image to have a preset density and a preset contrast.

By setting a density region converted using the gradation table as the specific density region, it is possible to generate a gradation-processed image having a preset density and a preset contrast in association with the gradation table and the specific density region.

What is claimed is:

1. An image processing apparatus comprising:
   a non-transitory storage medium for storing an input image; and
   a processor coupled to the non-transitory storage medium and configured at least to:
   acquire at least one of a maximum value or a minimum value among pixel values of a subject region included in the input image;
   set a specific density region having a preset width density range with respect to the input image; and
   perform the dynamic range compression process with respect to the input image, on the basis of a first compression amount for compressing the at least one of the maximum value or the minimum value among the pixel values of the subject region into the specific density region, wherein the minimum value among the pixel values of the subject region is compressed to a minimum value among the pixel values of the specific density region or the maximum value among the pixel values of the subject region is compressed to a maximum value among the pixel values of the specific density region, and a preset second compression amount for compressing at least one of a high-density region or a low-density region in the specific density region, to generate a dynamic range compression image.

2. The image processing apparatus according to claim 1, wherein the compression processing unit performs a first dynamic range compression process using a first compression table based on the first compression amount and performs a second dynamic range compression process using a second compression table based on the second compression amount, with respect to the input image, to generate the dynamic range compression image.

3. The image processing apparatus according to claim 2, further comprising:
   compression table generation unit for generating the first compression table.

4. The image processing apparatus according to claim 1, wherein the compression processing unit performs the dynamic range compression process using a compression table based on the first compression amount and the second compression amount, with respect to the input image, to generate the dynamic range compression image.

5. The image processing apparatus according to claim 4, further comprising:
   compression table generation unit for generating the compression table.

6. The image processing apparatus according to claim 1, further comprising:
   gradation processing unit for performing a gradation process using a preset gradation table with respect to the dynamic range compression image.

7. The image processing apparatus according to claim 6, wherein the density region setting unit sets a density region converted using the gradation table as the specific density region.

8. The image processing apparatus according to claim 1, wherein in a case where the input image is a motion picture including a plurality of frames, the density region setting unit sets the specific density region with respect to each of the plurality of frames, the pixel value acquisition unit acquires at least one of a representative value of maximum values or a representative value of minimum values among pixel values of a subject region included in each of the plurality of frames, and the compression processing unit performs the dynamic range compression process on the basis of the first compression amount and the second compression amount for compressing the at least one of the representative value of the maximum values or the representative value of the minimum values into the specific density region, in each of the plurality of frames, to generate the dynamic range compression image.

9. The image processing apparatus according to claim 1, wherein the density region setting unit sets the specific density region according to at least one of an imaging menu in imaging a subject to acquire the input image or an imaging portion of the subject.

10. An image processing method for performing a dynamic range compression process with respect to an input image, comprising:

acquiring at least one of a maximum value or a minimum value among pixel values of a subject region included in the input image;

setting a specific density region having a preset density range with respect to the input image; and performing the dynamic range compression process with respect to the input image, on the basis of a first compression amount for compressing the at least one of the maximum value or the minimum value among the pixel values of the subject region into the specific density region, wherein the minimum value among the pixel values of the subject region is compressed to a minimum value among the pixel values of the specific density region or the maximum value among the pixel values of the subject region is compressed to a maximum value among the pixel values of the specific density region, and a preset second compression amount for compressing at least one of a high-density region or a low-density region in the specific density region, to generate a dynamic range compression image.

11. A non-transitory computer-readable recording medium having stored therein an image processing program that causes a computer to execute an image processing method for performing a dynamic range compression process with respect to an input image, the program causing the computer to execute:

a process of acquiring at least one of a maximum value or a minimum value among pixel values of a subject region included in the input image;

a process of setting a specific density region having a preset density range with respect to the input image; and a process of performing the dynamic range compression process with respect to the input image, on the basis of a first compression amount for compressing the at least one of the maximum value or the minimum value among the pixel values of the subject region into the specific density region, wherein the minimum value among the pixel values of the subject region is compressed to a minimum value among the pixel values of the specific density region or the maximum value among the pixel values of the subject region is compressed to a maximum value among the pixel values of the specific density region, and a preset second compression amount for compressing at least one of a high-density region or a low-density region in the specific density region, to generate a dynamic range compression image.

* * * * *